US011157856B2

(12) United States Patent
Krucek et al.

(10) Patent No.: US 11,157,856 B2
(45) Date of Patent: Oct. 26, 2021

(54) SYSTEMS AND METHODS FOR QUALITY MANAGEMENT SYSTEM DEPLOYMENT

(71) Applicant: Talkdesk, Inc., San Francisco, CA (US)

(72) Inventors: Katherine Krucek, Deer Park, IL (US); Richard Lawrence, San Diego, CA (US); Jason Fama, San Carlos, CA (US)

(73) Assignee: Talkdesk, Inc., San Francisco, CA (US)

( * ) Notice: Subject to any disclaimer, the term of this patent is extended or adjusted under 35 U.S.C. 154(b) by 91 days.

(21) Appl. No.: 16/666,498

(22) Filed: Oct. 29, 2019

(65) Prior Publication Data

US 2021/0125117 A1  Apr. 29, 2021

(51) Int. Cl.
*H04M 3/00* (2006.01)
*G06Q 10/06* (2012.01)
*G06Q 10/10* (2012.01)
*G06F 16/909* (2019.01)
*H04M 3/523* (2006.01)
*H04M 3/22* (2006.01)
*H04M 3/51* (2006.01)

(52) U.S. Cl.
CPC ....... *G06Q 10/0633* (2013.01); *G06F 16/909* (2019.01); *G06Q 10/06312* (2013.01); *G06Q 10/1097* (2013.01); *H04M 3/2227* (2013.01); *H04M 3/5175* (2013.01); *H04M 3/5234* (2013.01); *H04M 2203/401* (2013.01)

(58) Field of Classification Search
CPC .............. H04M 3/5183; H04M 3/5166; G06Q 10/0633
See application file for complete search history.

(56) References Cited

U.S. PATENT DOCUMENTS

| | | | |
|---|---|---|---|
| 9,286,413 B1 * | 3/2016 | Coates | H04L 29/08072 |
| 2010/0250196 A1 | 9/2010 | Lawler et al. | |
| 2013/0085785 A1 * | 4/2013 | Rogers | G06Q 10/06 705/4 |
| 2019/0132443 A1 | 5/2019 | Munns et al. | |
| 2019/0172291 A1 * | 6/2019 | Naseath | G07C 9/00912 |
| 2019/0306315 A1 | 10/2019 | Portman et al. | |
| 2020/0211120 A1 | 7/2020 | Wang et al. | |

* cited by examiner

*Primary Examiner* — Rasha S Al Aubaidi
(74) *Attorney, Agent, or Firm* — Rimon PC; Marc Kaufman

(57) ABSTRACT

A system for quickly deploying QM systems in contact centers is provided. A user or administrator can quickly install a QM application on a deployment server. The administrator can provide the QM application access to the contact center data where the QM application can import data from the contact center routing system about one or more customers, agents, queues, teams, and any other information or items typically associated with contact center routing systems. The imported data may also include presence data about the agents, teams, and customers. Based on the imported data, the QM application may execute one or more workflows to automatically determine information such as evaluation frequency and coaching frequency about the agents and teams, or to create or select quality forms to use for the evaluation one or more agents, teams, or contacts.

17 Claims, 10 Drawing Sheets

100

200

SYSTEMS AND METHODS FOR QUALITY MANAGEMENT SYSTEM DEPLOYMENT

BACKGROUND

The initial deployment and configuration of a contact center quality management (QM) application is typically a time-consuming process often taking weeks or months. Within a QM application, users must be set up manually (agents, evaluators/quality analysts, supervisors/managers, admins, etc.) as well as the creation and association of things like queues/skills, teams, and quality forms (evaluation templates) is also done manually. The inability of QM applications to configure these items quickly and automatically leads to a large amount of work for QM administrators to collect, interpret, and input the necessary information.

SUMMARY

A system for quickly deploying a QM application in contact centers is provided. A user or administrator can quickly install a QM application on a deployment server. The administrator can provide QM application access to the contact center routing system where the QM application can import data from the contact center routing system about one or more customers, agents, queues, teams, and any other information or items typically associated with contact center application setup. The imported data may also include presence data about the agents, teams, and customers. Based on the imported data, the QM application may execute one or more workflows to automatically determine information such as evaluation frequency and coaching frequency about the agents and teams, or to create or select quality forms to use for the evaluation of one or more agents, teams, or contacts.

As may be appreciated, the QM deployment systems and methods described herein provide many advantages over the prior art. By leveraging the information that is already part of the contact center routing system used by an entity, the QM application can be easily and quickly deployed without significant input from an administrator. Accordingly, the QM deployment systems and applications described herein can save these entities significant time and money.

In an embodiment, a method for configuring an application for a contact center is provided. The method includes: interfacing with a contact center by an application; receiving contact center data from the contact center by the application; receiving a selection of an item of the application to configure by the application; based on the selected item, selecting a workflow corresponding to the selected item by the application; and configuring the item of the application automatically using the selected workflow and the contact center data by the application.

Implementations may include some or all of the following features. The application is a QM application. Configuring the item of the application automatically using the selected workflow and the contact center data by the application may include configuring one or more evaluation frequencies. Configuring the item of the application automatically using the selected workflow and the contact center data by the application may include configuring one or more coaching frequencies. Configuring the item of the application automatically using the selected workflow and the contact center data by the application may include configuring one or more calibration frequencies. Configuring the item of the application automatically using the selected workflow and the contact center data by the application may include configuring one or more forms. Interfacing with the contact center by the application may include: requesting credentials from a user associated with the contact center; and interfacing with the contact center using the requested credentials.

In an embodiment, a method for configuring a quality management system for a contact center is provided. The method includes: interfacing with a contact center by a quality management system; determining a plurality of agents associated with the contact center by the quality management system; retrieving presence data for each agent from the contact center, wherein the presence data for an agent comprises a plurality of events and each event is associated with a time; for at least one agent of the plurality of agents, determining an evaluation frequency based on the presence data for the at least one agent by the quality management system; and presenting the determined evaluation frequency for confirmation by the quality management system.

Implementations may include some or all of the following features. Determining the evaluation frequency based on the presence data for the at least one agent may include: inferring, from the presence data, a seniority for the at least one agent; and determining the evaluation frequency for the at least one agent based on determined seniority. The events may include one or more of computer logins, computer logouts, communications, and application activities. The method may further include, for the at least one agent of the plurality of agents, determining, based on the presence data, a coaching frequency for the at least one agent. The evaluation frequency may include a self-evaluation frequency. The method may further include determining a plurality of teams associated with the contact center; retrieving contact center data for each team from the contact center; for at least one team of the plurality of teams, recommending a quality form for the team based on the contact center data. Interfacing with the contact center by the quality management system may include: requesting credentials from a user associated with the contact center; and interfacing with the contact center using the requested credentials.

In an embodiment, a method for configuring a quality management system for a contact center is provided. The method includes: interfacing with a contact center by a quality management system; determining a plurality of agents associated with the contact center by the quality management system; retrieving presence data for each agent from the contact center by the quality management system, wherein the presence data for an agent comprises a plurality of events and each event is associated with a time; for at least one agent of the plurality of agents, determining a coaching frequency based on the presence data for the at least one agent by the quality management system; and presenting the determined coaching frequency for confirmation by the quality management system.

Implementations may include some or all of the following features. Determining the coaching frequency based on the presence data for the at least one agent may include: inferring, from the presence data, a seniority for the at least one agent; and determining the coaching frequency for the at least one agent based on determined seniority. The events may include one or more of computer logins, computer logouts, communications, and application activities. The method may further include: for the at least one agent of the plurality of agents, determining, based on the presence data, an evaluation frequency for the at least one agent. The evaluation frequency comprises a self-evaluation frequency. The method may further include: determining a plurality of teams associated with the contact center; retrieving contact center data for each team from the contact center; for at least one team of the plurality of teams, recommending a quality form template for the team based on the contact center data. Interfacing with the contact center by the quality management system may include: requesting credentials from a user associated with the contact center; and interfacing with the contact center using the requested credentials.

In an embodiment, a method for configuring a quality management system for a contact center is provided. The method includes: interfacing with a contact center by a quality management system; determining a plurality of teams associated with the contact center by the quality management system; retrieving contact center data for each team from the contact center by the quality management system; for at least one team of the plurality of teams, determining a quality form template for the team based on the contact center data by the quality management system; and presenting the determined quality form template for the at least one team for confirmation by the quality management system.

Implementations may include some or all of the following features. Interfacing with the contact center by the quality management system may include: requesting credentials from a user associated with the contact center; and interfacing with the contact center using the requested credentials. The method may further include: determining a plurality of agents associated with the contact center by the quality management system; retrieving presence data for each agent from the contact center by the quality management system, wherein the presence data for an agent comprises a plurality of agent activities and each agent activity is associated with a time; for at least one agent of the plurality of agents, determining a coaching frequency based on the presence data for the at least one agent; and presenting the determined coaching frequency for confirmation. The method may further include: determining a plurality of agents associated with the contact center; retrieving presence data for each agent from the contact center by the quality management system, wherein the presence data for an agent comprises a plurality of events and each event is associated with a time; for at least one agent of the plurality of agents, determining an evaluation frequency based on the presence data for the at least one agent; and presenting the determined evaluation frequency for confirmation. The evaluation frequency may be a self-evaluation frequency. Interfacing with the contact center by the quality management system may include: requesting credentials from a user associated with the contact center; and interfacing with the contact center using the requested credentials. The quality form template may include a plurality of questions.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. While implementations will be described within the context of a cloud-based contact center routing system, it will become evident to those skilled in the art that the implementations are not limited thereto.

Figure 1:
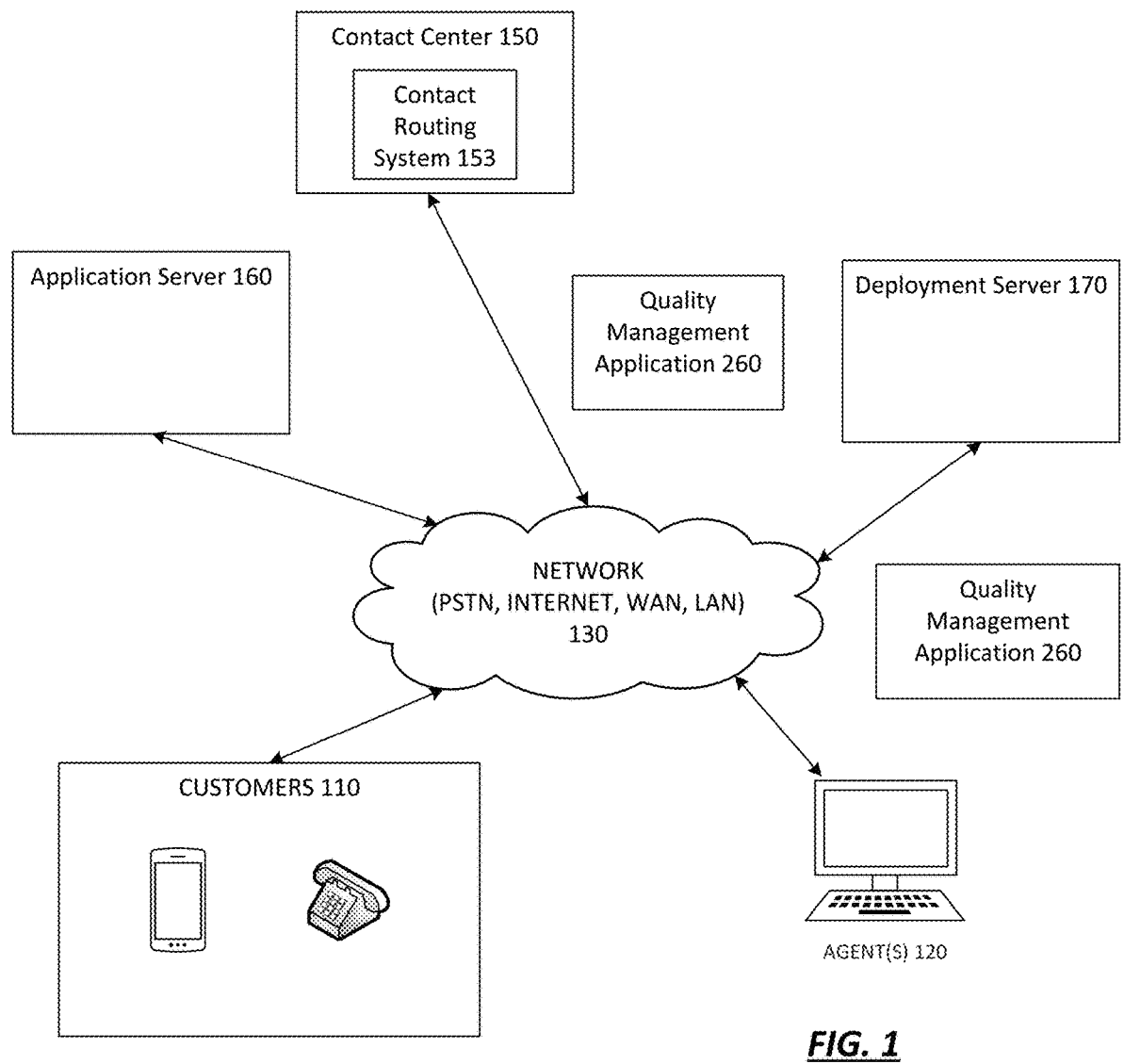
FIG. 1 is an illustration of an example system architecture.

FIG. 1 is an example system architecture 100, and illustrates example components, functional capabilities and optional modules that may be included in a cloud-based contact center infrastructure solution. Customers 110 interact with a contact center 150 using voice, email, text, and web interfaces in order to communicate with the agents 120 through a network 130 and one or more of text or multimedia channels. The platform that controls the operation of the contact center 150 including the routing and handling of communications between customers 110 and agents 120 for the contact center 150 is referred to herein as the contact routing system 153. Depending on the embodiment, the contact routing system 153 could be any of a contact center as a service (CCaS) system, an automated call distributor (ACD) system, or a case system, for example. Depending on the embodiment, a customer 110 may refer to purchaser of the contact routing system 153 and/or the QM application 260, or a user or entity that communicates with the contact routing system 153, for example.

The agents 120 may be remote from the contact center 150 and handle communications with customers 110 on behalf of an enterprise. The agents 120 may utilize devices, such as but not limited to, work stations, desktop computers, laptops, telephones, a mobile smartphone and/or a tablet. Similarly, customers 110 may communicate using a plurality of devices, including but not limited to, a telephone, a mobile smartphone, a tablet, a laptop, a desktop computer, or other. For example, telephone communication may traverse networks such as a public switched telephone networks (PSTN), Voice over Internet Protocol (VoIP) telephony (via the Internet), a Wide Area Network (WAN) or a Large Area Network (LAN). The network types are provided by way of example and are not intended to limit types of networks used for communications.

In some embodiments, the agents 120 may be assigned to one or more queues. The agents 120 assigned to a queue may handle communications that are placed in the queue by the contact routing system 153. For example, there may be queues associated with a language (e.g., English or Chinese), topic (e.g., technical support or billing), or a particular country of origin. When a communication is received by the contact routing system 153, the communication may be placed in a relevant queue, and one of the agents 120 associated with the relevant queue may handle the communication.

The agents 120 of a contact center 150 may be further organized into one or more teams. Depending on the embodiment, the agents 120 may be organized into teams based on a variety of factors including, but not limited to, skills, location, experience, assigned queues, associated or assigned customers 110, and shift. Other factors may be used to assign agents 120 to teams.

Entities that employ workers such as agents 120 typically use a QM system. QM systems are typically used to ensure that the agents 120 are providing customers 110 with a high-quality product or service. The QM systems do this by determining when and how to evaluate, train, and coach each agent 120 based on seniority, team membership, or associated skills as well as quality of performance while handling customer 110 interactions. The QM systems may further generate and provide surveys or questionnaires to customers 110 to ensure that they are satisfied with the service being provided by the contact center 150.

As may be appreciated, initially gathering and providing the information needed by a QM system may be a time-consuming task. Accordingly, to solve this problem, the environment 100 further includes a QM application 260 that may be quickly deployed. The workings of both the application will be described in further detail with respect to FIG. 2.

Initially, when an administrator associated with a contact routing system 153 desires to set up a QM system, the administrator may first create or designate what is referred to as a deployment server 170. The deployment server 170 executing the QM application 260 may be the QM system for the contact center 150. Note that depending on the embodiment, the QM system may be implemented on its own deployment server 170. In addition, some or all of the contact routing system 153 or the QM system may be implemented together on the same computer, deployment server 170, or cloud-computing environment. An example deployment server 170 is the computing system 1100 illustrated with respect to FIG. 11.

After creating the deployment server 170, the administrator may then cause the QM application 260 to be installed on the deployment server 170 by an application server 160. Depending on the embodiment, the application server 160 may function similar to an "app store" where the administrator of the contact center 150 may view the applications (including the application 260) that are available for download. After selecting the QM application 260, the application server 160 may cause the application 260 to be installed on the deployment server 170.

In order to configure the QM application 260, rather than have the administrator configure the application 260 from scratch, the application 260 may be configured to interface with, and retrieve data from, the contact routing system 153. As may be appreciated, because the contact routing system 153 already includes data that is relevant to the QM application 260 (e.g., information on agents 120 and information on customers 110), it may be desirable to import the data directly from the contact routing system 153.

After the relevant data has been imported into the QM application 260 the application may have one or more workflows that can be executed by the administrator to automatically set up and configure the application using the imported data. Each workflow may attempt to configure the associated application from the imported data with as little input from the administrator as possible. At the end of each workflow, the administrator may be asked to confirm or accept any proposed configurations or settings suggested by the workflow.

For example, with respect to the QM application 260, there may be workflows that infer, for each agent 120, team of agents 120, or customer 110, settings such as evaluation frequency and coaching frequency. The workflows may further recommend QM forms to use for each agent 120, team, or customer 110. The particular workflows will be described further with respect to FIG. 2.

As may be appreciated, the embodiments described herein are not limited to configuring QM applications 260 using data imported from a contact routing system 153. Other sources of data may be used. For example, the application 260 may import data from a variety of systems including, but not limited to, customer relationship management systems and document management systems. Other systems may be included.

Figure 2:
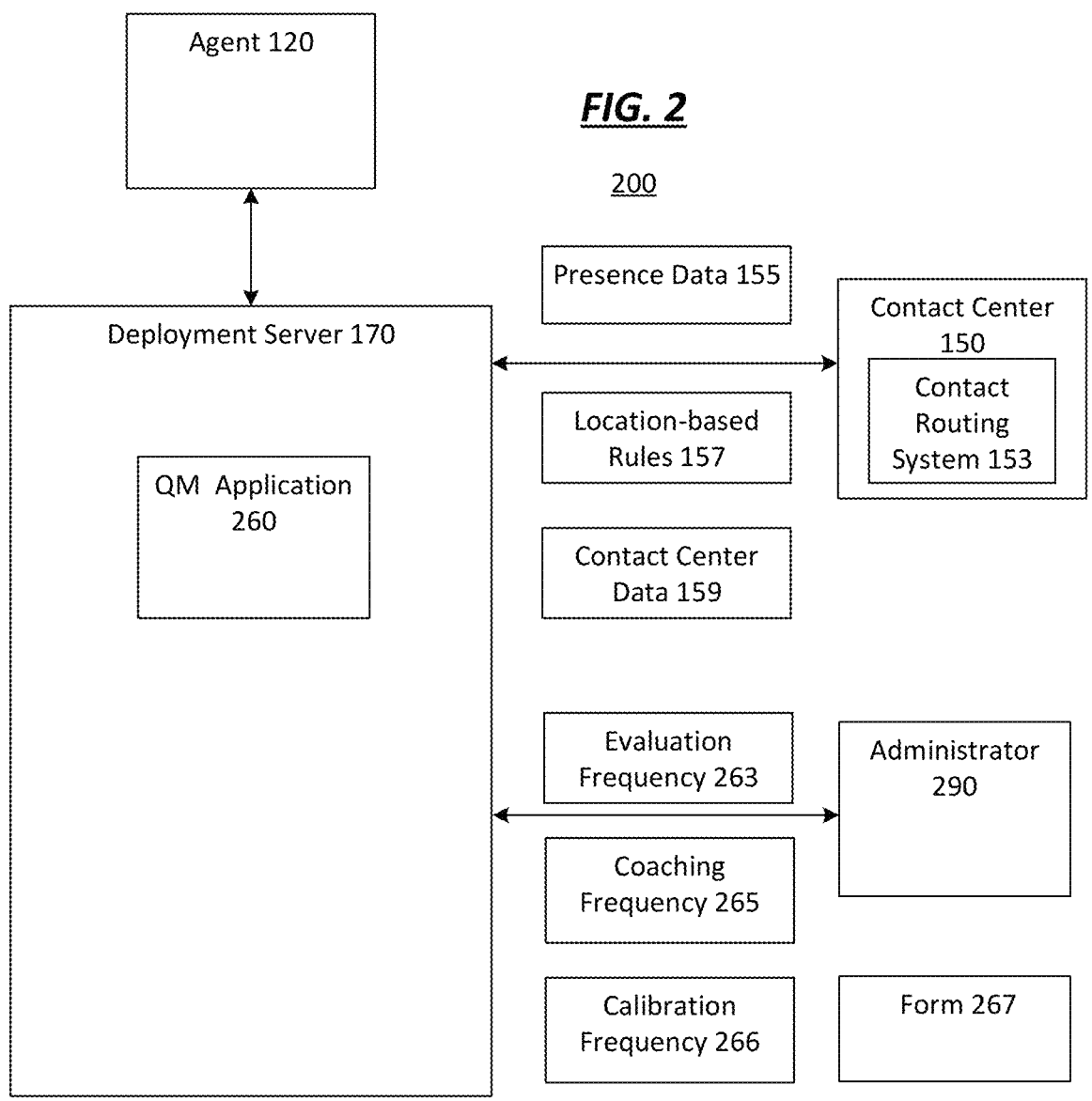
FIG. 2 is an illustration of an example environment for installing and configuring a QM application.

FIG. 2 is an illustration of an example environment 200 for installing and configuring a QM application 260. As shown, the environment 200 includes a deployment server 170, a contact routing system 153, and an administrator 290. Depending on the embodiment, each of the contact routing system 153, deployment server 170, and administrator 290 may be implemented together or separately by one or more general purpose computing devices such as the computing system 1000 illustrated with respect to FIG. 10.

The administrator 290 may cause the QM application 260 to be installed on the deployment server 170. As part of the configuration process, the administrator 290 may allow the QM application 260 to access the contact routing system 153. For example, the administrator 290 may provide credentials (e.g., login and password) to the QM application 260, and the QM application 260 may use an API to access the contact routing system 153 using the credentials. Other methods for accessing a contact routing system 153 (or other data source) may be used.

The QM application 260 may initially download contact center data 159 and may begin using the contact center data 159 to configure the QM application 260 for the administrator 290. Depending on the embodiment, the contact center data 159 may include information about the contact center 150 such as information about the agents 120, teams that the agents 120 are organized into, queues associated with the contact center 150, contacts 110 associated with the contact center 150, skills associated with the agents 120 and queues, historical contact data (e.g., historical data for each queue about the volume of contacts, handling times, etc.), seniority information about each agent 120, and event types.

The contact center data 159 may further include information about employees (e.g., supervisors or evaluators) who are responsible for evaluating agents 120 and providing coaching, any verticals associated with the business of the entity that controls the contact center 150, any departments that the employees and agents 120 may be divided into, and any historical QM forms that may have been used by the entity at the contact center 150. Other information such as location/region associated with agents 120 may be included in the contact center data 159.

The QM application 260 may use some or all of the contact center data 159 to begin setting up the QM application 260 for the administrator 290. For example, the QM application 260 may extract all of the agents 120 and employees associated with the contact center 150, their seniority (based on hire date) and/or their geographical location or region and may enter them into the QM application 260. The QM application 260 may similarly, extract information such as the customers 110 associated with the contact center 150, the queues associated with the contact center 150, and any teams associated with the contact center 150.

In some implementations, the QM application 260 may provide a graphical-user interface (GUI) through which the administrator 290 can review and control what information is imported into the QM application 260 from the contact center data 159. For example, the QM application 260 may ask the administrator 290 to confirm each agent 120, contact 110, team, or employee that it extracts from the contact center 150. Depending on the embodiment, the administrator 290 may also use the GUI to add any additional information to the QM application 260 including any agents 120, customers 110, teams, or queues that the QM application 260 was unable to extract from the contact center data 159.

As may be appreciated, by initially configuring the QM application 260 automatically using the contact center data 159, a great amount of time and energy is saved by the administrator 290. Previously, to configure a QM application 260, the administrator 290 would have had to manually add each setting and each agent 120, contact 110, queue, or team to the QM application 260.

In addition to the automatic importing of certain contact center data 159. The QM application 260 described herein may use one or more workflows to infer additional QM application 260 items or settings to further reduce the amount of time that the administrator 290 may spend configuring the application. The QM application 260 may infer the items or settings from the contact center data 159.

An important area of a QM application 260 that also tends to be time-consuming for an administrator 290 to configure is the setup of quality evaluation forms (sometimes also referred to as scoring templates or scorecards) that will be used for evaluating/scoring agent performance while handling customer interactions. The first part is operational as consensus must be reached on the key metrics to measure in order to drive performance improvements and to increase the quality of customer experiences (i.e. what criteria will be used/what questions will be asked on the evaluation form).

The second challenge is the feasibility of creating/building the evaluation form template within the QM system itself. This can be a complex and time-consuming process if the QM evaluation form is not built with user experience in mind and the interface is not user-friendly or intuitive. This QM application 260 will have the ability to auto-suggest form templates to be selected for publishing (either "as is" or with some further tweaks/edits by the administrator) and used for evaluation purposes. If one or more of the auto-suggested templates (recommended by the QM application 260) is not chosen during initial setup, they will be available later for manual selection from a library of form templates. These form templates will vary in content (i.e. types of sections, questions, and response options) based on criteria including but not limited to: industry vertical (e.g. healthcare vs. finance vs. retail, etc.), type of assessment (e.g. phone vs. digital channels), and line of business/department (e.g. sales vs. support). This information will be inferred based on the contact center data 159 which was imported from the contact routing system 153 during initial setup of the QM application 260. This contact center data 159 used for inferring form template type will include but not be limited to entities such as: team name, queue name, as well as geographical location/region and/or seniority date of the agents 120 assigned to a team or queue.

For example, for teams with team names that include "Inbound Calls" or "Outbound Calls" and are assigned to queues with queue names including "Sales", the QM application 260 will auto-suggest the form template "Phone—Retail/Sales" targeted towards the retail industry, and containing sales-related question content such as "did the agent offer product X with service Y in an attempt to up-sell/cross-sell the caller?" Another example could be teams with team names including "Banking" or "Compliance" assigned to queues with queue names including "Customer Service" in which case the QM application 260 would auto-suggest a form template such as "Phone—Finance/Customer Service" containing question content tailored for the Finance industry centered around compliance, which would contain question content such as: "If the customer asked where the agent was located, did the agent provided them with an accurate answer?" Form templates will be auto-suggested by the QM application 260 with the administrator 290 having the ability to accept or decline the auto-suggested form templates. Accepting or declining can be for either all auto-suggested templates or certain selected ones (one or more). If all auto-suggested templates are declined, the administrator will be presented with a message asking if a Generic form template should be used (can accept or decline it). Either decision (accept or decline) can be changed later as the administrator 290 will have the ability to go into the configuration area of the QM application 260 to manually select one or more form templates from the template library at any time. Furthermore, form templates accepted during initial setup can be modified at any time in order to change the form name, description, team assignment, section names, question type and content, option choices for responses/answers, and associated point values. The intent is to speed up the initial form setup process and reduce administrator 290 effort as part of the QM application 260 configuration.

The QM application 260 may also infer the one or more items from what is referred to herein as presence data 155. Depending on the embodiment, the presence data 155 may include a plurality of events associated with each agent 120 or customer 110, and each event may be associated with a time. For an agent 120, the events may include logging in or out of a computer, receiving or responding to a communication such as an email or telephone call, and updating a record in an application, for example. Other types of events may be supported.

In some embodiments, the presence data 155 may be received from the contact routing system 153 by the QM application 260. Alternatively, or additionally, the presence data 155 may be extracted from the contact center data 159. The events included in the presence data 155 may be selected by the administrator 290, for example.

For a customer 110, the events may include sending a communication to the contact center 150, receiving a communication from the contact center 150, and interacting with an agent 120. Other types of events may be supported.

The QM application 260 may use workflows to infer one or more items such as evaluation frequencies 263, coaching frequencies 265, calibration frequencies 266, and QM forms 267. Other configurable items may be configured using a workflow.

With respect to evaluation frequencies 263, the QM application 260 may ask the administrator 290 (using the GUI) whether agents 120 across all teams have the same evaluation frequency or whether this differs by team. If an administrator 290 answers that it differs by team, then the QM application 260 may ask the administrator 290 if each agent 120 within a particular team has the same evaluation frequency 263 (e.g., once a week, once a month, or once a quarter). Evaluation frequency 263 may refer to one or both of self-evaluations and evaluations performed by a superior. If the administrator 290 answers affirmatively, the QM application 260 may request the evaluation frequency 263 for the agents 120 in that team from the administrator 290. The QM application 260 may then consider the next team of the contact center 150 repeating through all available teams.

If the administrator 290 answers negatively (i.e., each agent 120 does not have the same evaluation frequency 263), the QM application 260, for each agent 120 of the team, may use the contact center data 159 and/or the presence data 155 to determine the evaluation frequency 263 for the agent 120.

In one embodiment, the QM application 260 may use the contact center data 159 and/or the presence data 155 to determine the seniority of an agent 120 and may determine the evaluation frequency 263 of the agent 120 based on the seniority of the agent 120. For example, the contact center data 159 may indicate a start date for the agent 120, or the presence data 155 may indicate the earliest date that the agent 120 logged into the contact routing system 153 of the contact center 150. The QM application 260 may use the start date of the agent 120 to determine the seniority of the agent 120.

After determining the seniority of the agent 120, the QM application 260 may use one or more rules to determine the evaluation frequency of 263 of the agent 120 based on the seniority. An example rule is an evaluation frequency 263 of twice a month for agents 120 with a seniority of less than a year, and an evaluation frequency 263 of once a month for agents 120 with a seniority of more than a year. The rules used to determine the evaluation frequency 263 may be set by the administrator 290 or may be based on one or more industry standards, for example.

After the QM application 260 infers evaluation frequencies 263 for the agents 120 in a team, the QM application 260 may present the determined evaluation frequencies 263 for each agent 120 to the administrator 290 through the GUI. The administrator 290 may then accept or modify the evaluation frequencies 263 for each agent 120.

With respect to coaching frequencies 265, the QM application 260 may ask the administrator 290 (using the GUI) whether agents 120 across all teams have the same coaching frequency or whether this differs by team. If an administrator 290 answers that it differs by team, then the QM application 260 may ask the administrator 290 if each agent 120 within a team has the same coaching frequency 265 (e.g., once a month, once a quarter, or once a year). Coaching frequency 265 may refer to how often an agent 120 meets with a superior to receive coaching on a particular topic. If the administrator 290 answers affirmatively, the QM application 260 may request the coaching frequency 265 for the agents 120 in the team from the administrator 290. The QM application 260 may then consider the next team of the contact center 150 repeating through all available teams.

If the administrator 290 answers negatively (i.e., each agent 120 does not have the same coaching frequency 265), the QM application 260, for each agent 120 of the team, may use the contact center data 159 and/or the presence data 155 to determine the coaching frequency 265 for the agent 120.

Similar to the evaluation frequency 263, the QM application 260 may use the contact center data 159 and/or the presence data 155 to infer the seniority of an agent 120 and may determine the coaching frequency 265 of the agent 120 based on the seniority of the agent 120.

After inferring the seniority of the agent 120, the QM application 260 may use one or more rules to determine the coaching frequency of 265 of the agent 120 based on the seniority. The rules used to determine the coaching frequency 265 may be set by the administrator 290 or may be based on one or more industry standards, for example.

After the QM application 260 infers coaching frequencies 265 for the agents 120 in a team, the QM application 260 may present the determined coaching frequencies 265 for each agent 120 to the administrator 290 through the GUI. The administrator 290 may then accept or modify the coaching frequencies 265 for each agent 120.

With respect to calibration frequencies 266, each QM form used by the QM application 260 may be periodically calibrated by one or more supervisors to ensure that everyone has the same understanding of the questions on the QM form 267. QM forms 267 may be used by various supervisors to grade the performance of agents 120 and other employees of the contact center 150. By periodically calibrating the QM forms 267, the QM application 260 may ensure that the questions of the QM form 267 are being interpreted and applied the same way by each supervisor.

To set the calibration frequencies 266, the QM application 260 may ask the administrator 290 (using the GUI) whether a standard set of QM forms are to be used for the QM application 260. If the administrator 290 answers affirmatively, the QM application 260 may request the QM forms 267 from the administrator 290 and may prompt the administrator 290 to enter the calibration frequencies 266 for each QM form 267.

If the administrator 290 answers negatively (i.e., there is no standard set of QM forms), the QM application 260 may use the contact center data 159 to determine the calibration frequencies 266 for each QM form 267.

As described above, one or more QM forms used by the contact center 150 may be indicated in the contact center data 159. For each indicated QM form 267, the QM application 260 may infer a calibration frequency 266 for the form 267 using one or more rules that relate characteristics of the form to one or more calibration frequencies 266. The characteristics may include form type, form complexity, etc. Depending on the embodiment, the one or more rules may be set by the administrator 290 or may be default rules associated with the QM application 260.

After the QM application 260 infers a calibration frequency 266 for each QM form 267, the QM application 260 may present the determined QM forms 267 and calibration frequencies 266 to the administrator 290 through the GUI. The administrator 290 may then accept or modify the calibration frequencies 266 and may accept or reject some or all of the determined QM forms 267.

Figure 3:
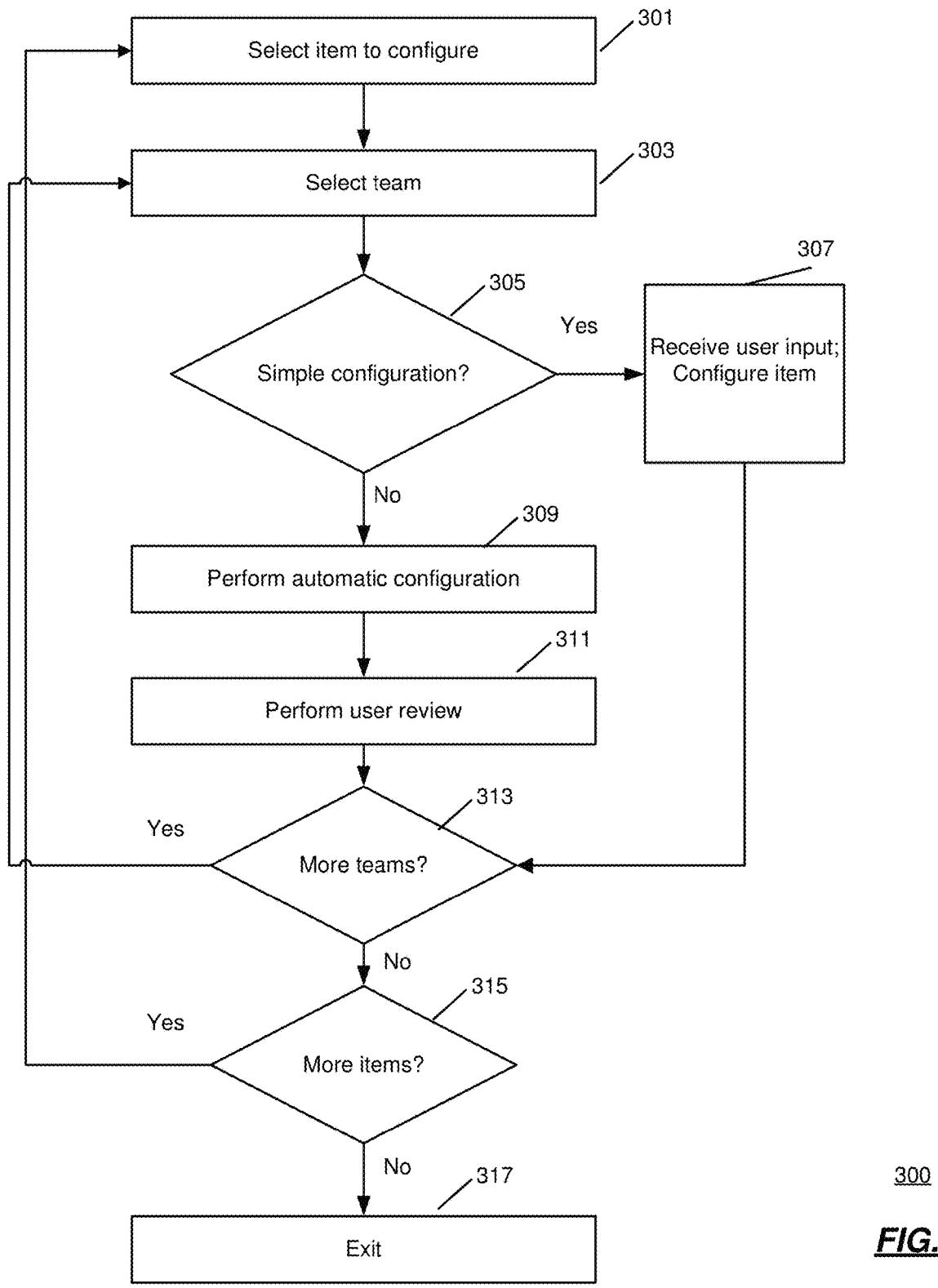
FIG. 3 is an illustration of an example method for configuring a QM system.

FIG. 3 is an illustration of an example method 300 for configuring a QM system. The method 300 may be performed by the QM application 260. Depending on the embodiment, an administrator 290 may have installed the QM application 260, and the method 300 may configure one or more items of the QM application 260 using contact center data 159 and presence data 155 automatically downloaded from a contact routing system 153.

At 301, an item is selected to configure. The item may be a configurable item or setting of the QM application 260. For the QM application 260, configurable items may include evaluation frequency 263, coaching frequency 265, calibration frequency 266, and QM forms 267. Other configurable items may be supported. Depending on the embodiment and items, the items may be configurable per agent 120, per customer 110, or per team, for example. The item may be selected automatically by the QM application 260, or may be selected by a user (e.g., administrator 290) using a GUI.

At 303, a team is selected. The team may be a group of agents 120 and may be selected by the administrator 290 through the GUI. Alternatively, the team may be selected automatically (i.e., without user input) by the QM application 260. Depending on the embodiment, the teams may be teams of the contact center 150 and may have been determined from contact center data 159 downloaded from the contact routing system 153. Because the teams were determined from the contact center data 159, the administrator 290 did not have to manually enter the teams (and associated agents 120) into the QM application 260.

At 305, a determination is made as to whether the selected item has a simple configuration with respect to the team. Depending on the embodiment, the QM application 260 may make the determination by asking the administrator 290 using the GUI.

Whether or not an item has a simple configuration may be dependent on the item. Generally, an item has a simple configuration if all agents 120 associated with the team have the same value or setting for the item. For example, for an item such as evaluation frequency 263, the item may have a simple configuration if all agents 120 of the team have the same evaluation frequency (e.g., once a month).

If the administrator 290 indicates that the item has a simple configuration, the method 300 may continue at 307. Else, the method 300 may continue at 309.

At 307, user input is received and the item is configured. Because the configuration was determined to be simple, the item may be configured by the QM application 260 asking the administrator 290 to provide a value for the item (through the GUI). User input including the value may be received from the administrator 290 and may be used by the QM application 260 to configure the item for all agents 120 associated with the team.

For example, the administrator 290 may provide the value "monthly" as the evaluation frequency 263 for the agents 120 in the team. The QM application 260 may then configure the evaluation frequency 263 to "monthly" for all agents 120 in the team.

At 309, automatic configuration of the item is performed. The automatic configuration of the item may be performed by the QM application 260 using one or both of the contact center data 159 or the presence data 155. In particular, the item may be configured by the QM application 260, for each agent 120 of the team, inferring the value of the item from the contact center data 159 or the presence data 155. The value may be inferred using a workflow associated with the item.

Continuing the example above, for an item such as the evaluation frequency 263, the QM application 256, for each agent 120 in the team, may analyze the presence data 155 associated with the agent 120 to determine events such as logins and application usage, that may indicate the date when the agent 120 first started working for the contact center 150. Based on the determined date the QM application 260 may infer the seniority of the agent 120. The evaluation frequency 263 for the agent 120 may be based on the inferred seniority.

At 311, a user review is performed. The user review may be performed by the QM application 260. Depending on the embodiment, the QM application 260 may display the proposed configuration for the item with respect to each agent 120 in the team to the administrator 290, and the administrator 290 may approve the configurations, or may provide different values to use for some or all of the proposed item configurations.

At 313, a determination is made of whether there are more teams that the selected item may be configured for. The determination may be made by the QM application 260. If there are more teams, then the method 300 may return to 303 where a new team may be selected. Else, the method 300 may continue at 315.

At 315, a determination is made of whether there are more items that may be configured. The determination may be made by the QM application 260. If there are more items, then the method 300 may return to 301 where a new item may be selected. Else, the method 300 may exit at 317.

Figure 4:
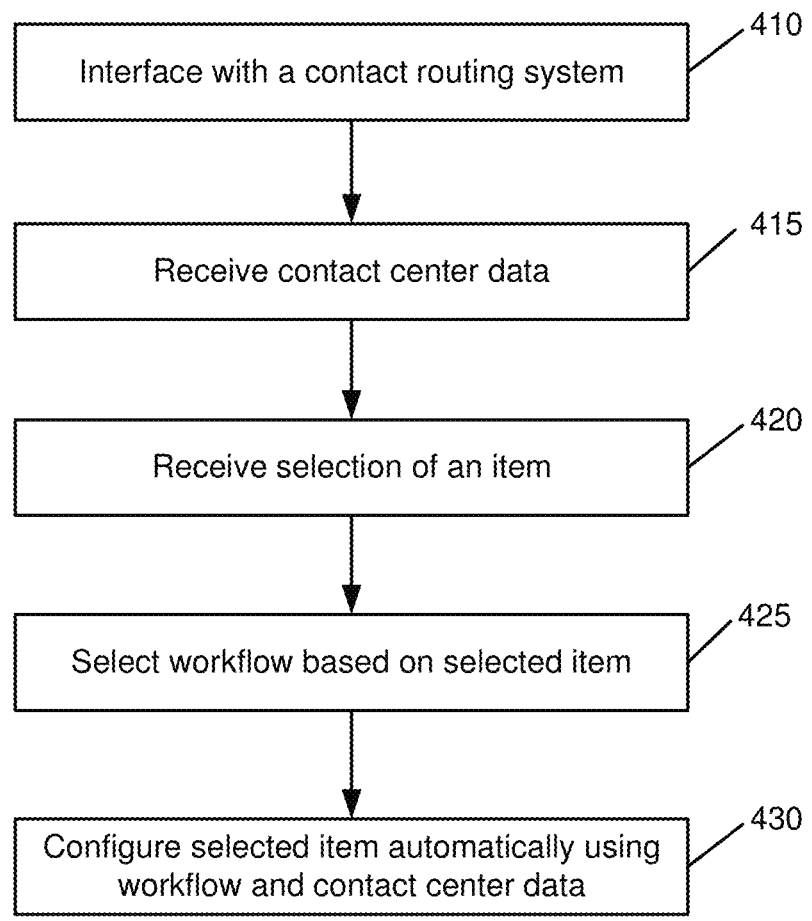
FIG. 4 is an illustration of an example method for automatically configuring items for a QM application based on data received from a contact center routing system.

FIG. 4 is an illustration of an example method 400 for automatically configuring items for a QM application 260 based on data received from a contact routing system 153. The method 400 may be implemented by the QM application 260.

A 410, a contact routing system is interfaced with. The QM application 260 may interface with the contact routing system 153 using credentials provided by the administrator 290.

At 415, contact center data 159 is received. The contact center data 159 may be received by the QM application 260 from the contact routing system 153 through the interface.

At 420, a selection of an item to configure is received. The selection of the item may be received by the QM application 260 from an administrator 290 through a GUI. The GUI may be used by the administrator 290 to configure the QM application 260.

The selected item may be a configurable item associated with the QM application 260 and may include evaluation frequency 263, coaching frequency 165, calibration frequency 266, and QM forms 267. Other items may be configured. The configurable items may be related to agents 120, teams, or customers 110 associated with the contact center 150.

At 425, a workflow corresponding to the selected item is selected. The workflow may be selected by the QM application 260 from a plurality of workflows.

At 430, the selected item is configured automatically using the selected workflow and the contact center data. The selected item may be configured by the QM application 260. Depending on the embodiment, the item may be configured also using presence data 155 and/or seniority, skills, and verticals determined from the contact center data 159.

Figure 5:
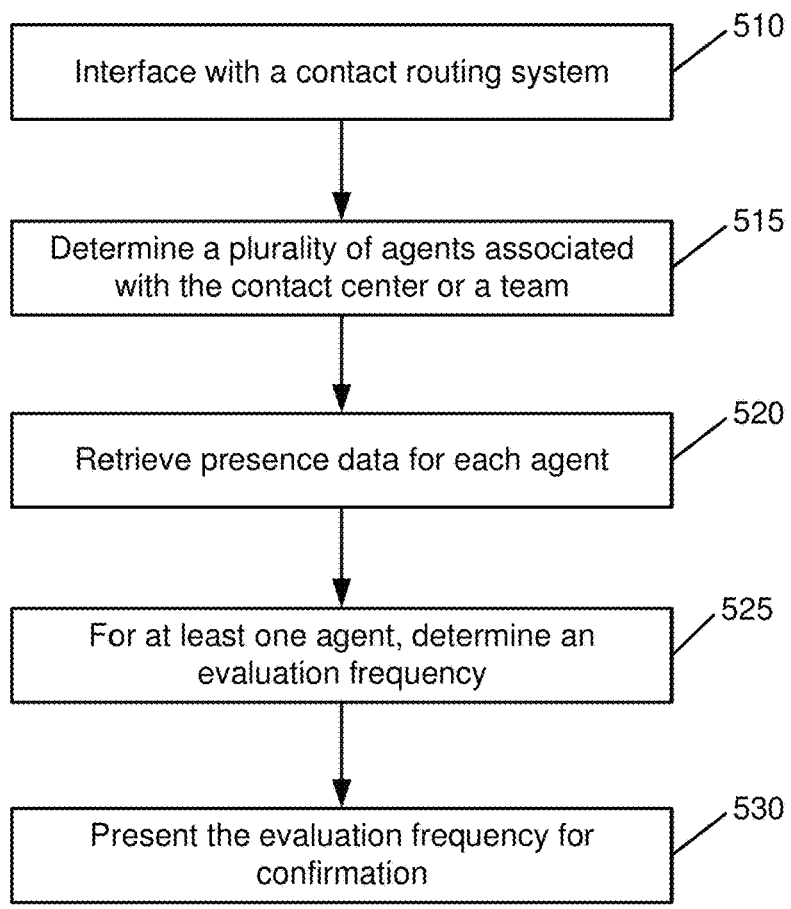
FIGS. 5-7 are illustrations of example methods for automatically configuring a QM application based on data received from a contact center routing system.

FIG. 5 is an illustration of an example method 500 for automatically configuring a QM application 260 based on data received from a contact routing system 153. The method 500 may be implemented by the QM application 260.

At 510, a contact routing system is interfaced with. A QM application 260 may interface with the contact routing system 153 as part of configuring the QM application 260. In some embodiments, an entity or administrator 290 associated with the contact center 150 may have determined to create and configure a QM system to ensure that the agents 120 of the contact center 150 are providing high quality service to the customers 110 of the contact center 150. Accordingly, the administrator 290 may have caused an instance of the QM application 260 to be installed on a deployment server 170. The deployment server 170 executing the QM application 260 may be referred to as the QM server.

At 515, a plurality of agents associated with the contact center are determined. The plurality of agents 120 may be determined by the QM application 260 from contact center data 159 received from the contact routing system 153. Depending on the embodiment, the QM application 260 may further determine teams associated with the contact center 150 and may determine agents 120 associated with each team.

At 520, presence data associated with each agent is received. The presence data 155 may be received by the QM application 260 from the contact routing system 153. Depending on the embodiment, the presence data 155 for an agent 120 may include a plurality of events, and each event may be associated with a time. The presence data 155 may be part of the contact center data 159 or may be received separately from the contact routing system 153. Depending on the embodiment, the QM application 260 may determine one or more of seniority, skills, and verticals for the agents 120 from the contact center data 159.

At 525, for at least one agent of the plurality of agents, an evaluation frequency may be determined. The evaluation frequency 263 may be determined by the QM application 260 using the presence data 155 associated with the at least one agent 120.

The evaluation frequency 263 for an agent 120 may be the frequency at which the performance of the agent 120 is evaluated or measured. The evaluation frequency 263 may include evaluations that are performed by superiors of the agent 120 as well as evaluations performed by the agent 120 (i.e., self-evaluations). By regularly evaluating agents 120 of the contact center 150 the QM application 260 can ensure that the agents 120 continue to provide high-quality service to customers 110 of the contact center 150.

In some embodiments, the QM application 260 may determine the evaluation frequency 263 using the presence data 155. In particular, the QM application 260 may use the presence data 155 to infer the seniority of the agent based on the first time the agent 120 is associated with an event such as a login into a computer or the use of an application. The time associated with the event may be used to estimate the seniority of the agent 120. The seniority of the agent 120 may then be used to select the evaluation frequency for the agent 120 according to guidelines or rules for setting evaluation frequencies 263. Generally, the greater the determined seniority of the agent 120, the lower the evaluation frequency 263.

Alternatively, the QM application 260 may determine the evaluation frequency 263 from one or more of seniority, skills, and verticals for the agent 120 determined from the contact center data 159. For example, the QM application 260 may determine the seniority of the agent 120 directly from the contact center data 159 and may determine the evaluation frequency 263 from the seniority.

At 530, the evaluation frequency is presented for confirmation. The evaluation frequency 263 may be presented to the administrator 290 for confirmation using a GUI. If the administrator 290 confirms the evaluation frequency, the evaluation frequency 263 may be associated with the agent 120 in the QM application 260. The method 800 may then determine an evaluation frequency 263 for another agent 120.

Figure 6:
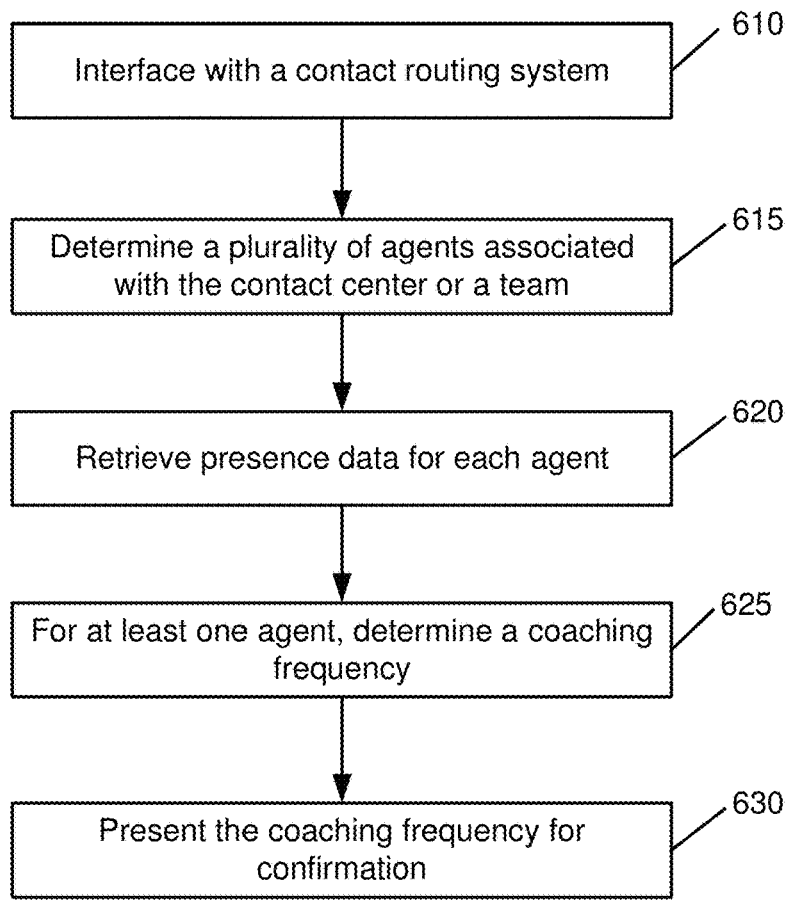

FIG. 6 is an illustration of an example method 600 for automatically configuring a QM application 260 based on data received from a contact routing system 153. The method 600 may be implemented by the QM application 260.

At 610, a contact routing system is interfaced with. A QM application 260 may interface with the contact routing system 153 as part of configuring the QM application 260.

At 615, a plurality of agents associated with the contact center are determined. The plurality of agents 120 may be determined by the QM application 260 from contact center data 159 received from the contact routing system 153.

At 620, presence data associated with each agent is received. The presence data 155 may be received by the QM application 260 from the contact routing system 153. Depending on the embodiment, the presence data 155 for an agent 120 may include a plurality of events, and each event may be associated with a time.

At 625, for at least one agent of the plurality of agents, a coaching frequency may be determined. The coaching frequency 265 may be determined by the QM application 260 using the presence data 155 associated with the at least one agent 120.

The coaching frequency 265 for an agent 120 may be the frequency at which the agent 120 is coached by another agent 120 or a superior. Coaching may include any instruction or guidance provided to an agent 120 by another agent 120 or superior. By regularly coaching agents 120 of the contact center 150 the QM application 260 can ensure that the agents 120 continue to perform at a high level and are up to date on the most recent contact center 150 policies and procedures.

In some embodiments, the QM application 260 may determine coaching frequency 265 using the presence data 155. Like the evaluation frequency 263, the QM application 260 may use the presence data 155 to infer the seniority of the agent 120 and may determine the coaching frequency 265 based on the seniority of the agent 120. Generally, the greater the determined seniority of the agent 120, the lower the coaching frequency 265.

Alternatively, the QM application 260 may determine the coaching frequency 263 from one or more of seniority, skills, and verticals for the agent 120 determined from the contact center data 159. For example, the QM application 260 may determine the seniority of the agent 120 directly from the contact center data 159 and may determine the coaching frequency 265 from the seniority.

At 630, the coaching frequency is presented for confirmation. The coaching frequency 265 may be presented to the administrator 290 for confirmation using a GUI. If the administrator 290 confirms the coaching frequency 265, the coaching frequency 265 may be associated with the agent 120 in the QM application 260. The method 900 may then determine a coaching frequency 265 for another agent 120.

Figure 7:
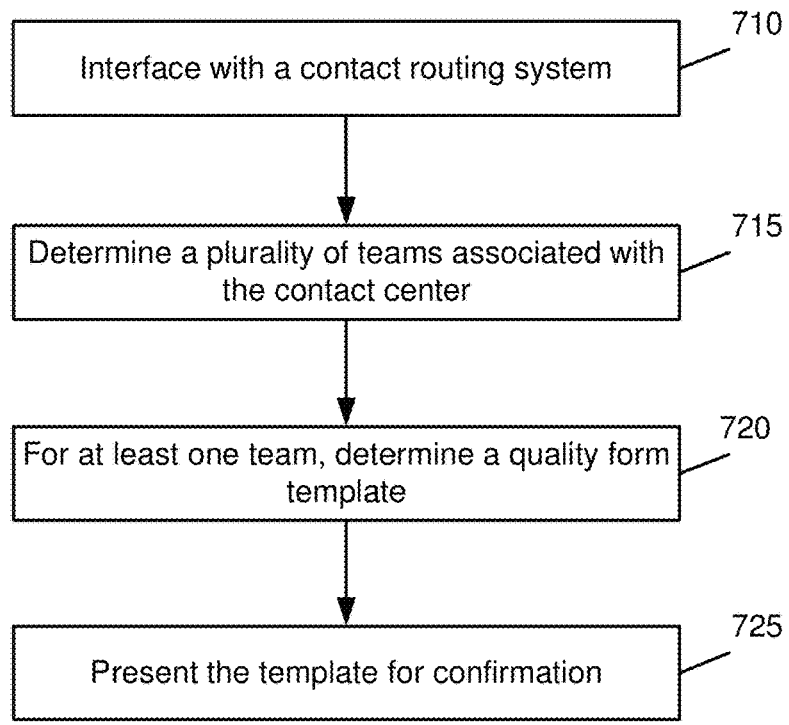

FIG. 7 is an illustration of an example method 700 for automatically configuring a QM application 260 based on data received from a contact routing system 153. The method 700 may be implemented by the QM application 260.

At 710, a contact routing system is interfaced with. A QM application 260 may interface with the contact routing system 153 as part of configuring the QM application 260.

At 715, a plurality of teams associated with the contact center are determined. The plurality of agents 120 may be determined by the QM application 260 from contact center data 159 received from the contact routing system 153. Depending on the embodiment, the QM application 260 may further determine teams associated with the contact center 150 and may determine agents 120 associated with each team.

At 720, for at least one team of the plurality of teams, a quality form is determined. The quality form 267 may be determined by the QM application 260 using the contact center data 159. The quality form 267 may be a quality form template and may be generated for the at least one team using the method 900 described in FIG. 9. Other methods may be used.

At 725, the quality form is presented for confirmation. The quality form 267 may be presented to the administrator 290 for confirmation using a GUI. If the administrator 290 confirms the quality form 267, the form 267 may be associated with the agent 120 in the QM application 260.

Figure 8:
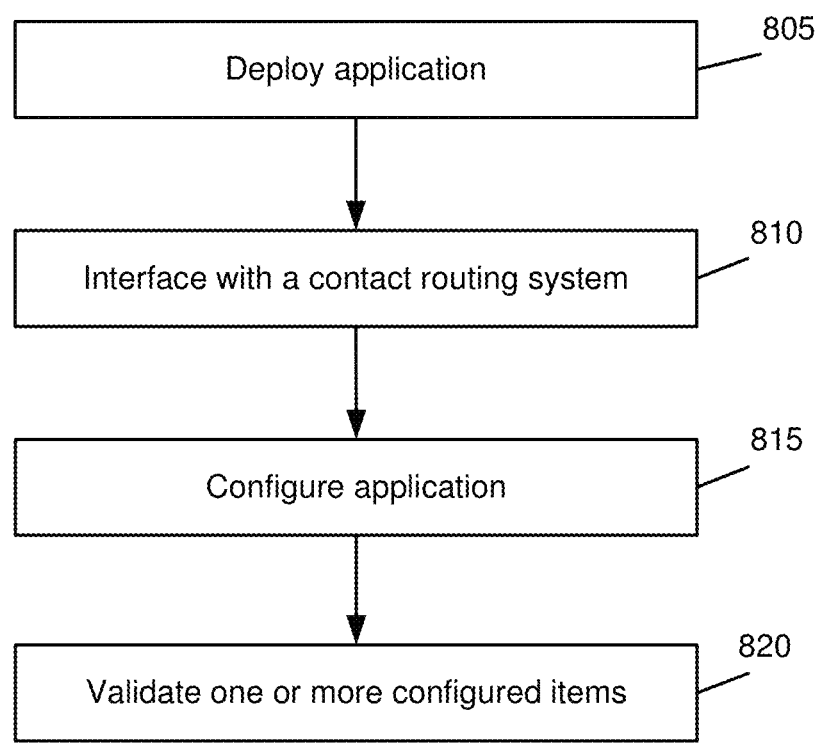
FIG. 8 is an illustration of an example method for automatically configuring a QM application using workflows.

FIG. 8 is an illustration of an example method 800 for automatically configuring a QM application 260 using workflows. The method 800 may be implemented by the QM application 260.

At 805, an application is deployed. The application may be a QM application 260 and may be deployed on a deployment server 170 by an administrator 290. Depending on the embodiment, the administrator 290 may have selected the application 260 to deploy from a plurality of applications made available by an application server 160.

At 810, a contact routing system is interfaced with. The QM application 260 may interface with the contact routing system 153 as part of configuring the QM application 260. The QM application 260 may import data from the contact routing system 153 such as contact center data 159 and presence data 155. Other types of data may be imported from the contact routing system 153.

At 815, the application is configured. The QM application 260 may be configured automatically using one or more workflows and the data imported from the contact routing system 153. The items of the QM application 260 that may be configured using workflows may include determining one or more of agents 120, other employees of the contact center 150 such as supervisors, evaluators, and quality analysts, teams, queues, skills, departments of the contact center 150, industry verticals associated with the contact center 150, departments of the contact center 150, historical contact data, and historical QM forms used by the contact center. Other items that may be configured include evaluation frequencies 263, coaching frequencies 265, calibration frequencies 266, and QM forms 267.

At 820, some or all of the configured items are validated. The one or more items may be validated by the administrator 290 through the GUI. Depending on the embodiment, the validated items may include any configured evaluation frequencies 263, coaching frequencies 265, calibration frequencies 266, and QM forms 267. Other configured items may be validated (or not validated).

Figure 9:
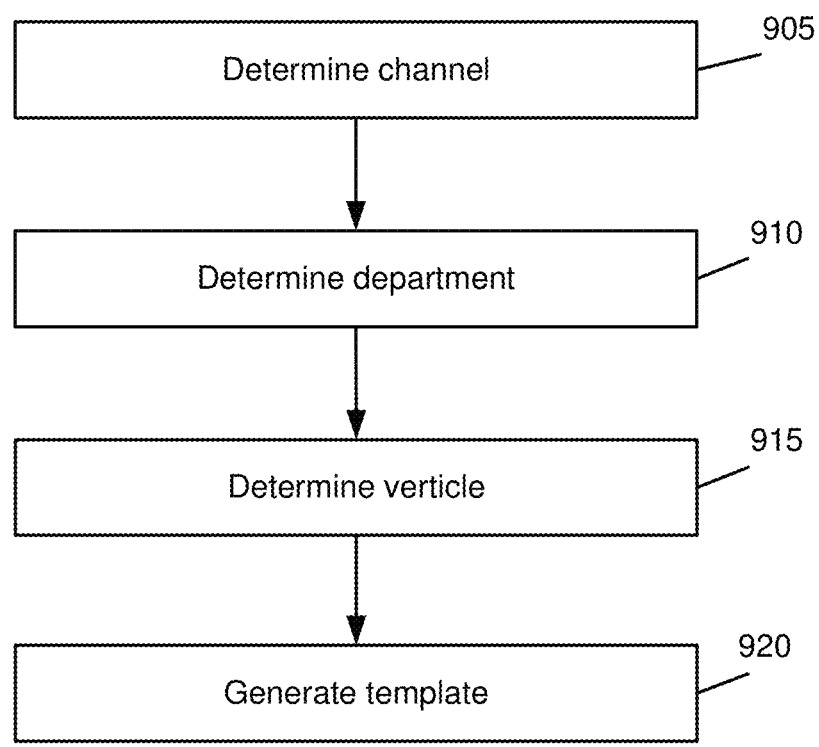
FIG. 9 is an illustration of an example method for generating a template.

FIG. 9 is an illustration of an example method 900 for generating a template. The method 900 may be implemented by the QM application 260.

At 905, a channel is determined. The channel may be a communications channel associated with the template and may be determined by the QM application 260. The communication channels may include email, telephone, SMS, or other channels. The particular communication channel used by the team may be inferred by the QM application 260 from the contact center data 159 or the name of the team, for example. If the QM application 260 cannot infer the channel the QM application 260 may ask the administrator 290 to clarify the communication channel.

At 910, a department is determined. The department may be determined by the QM application 260. The department may be the department or group associated with the team such as sales or support. The particular department associated with the team may be inferred by the QM application from the contact center data 159 or the name of the team, for example. If the QM application 260 cannot infer the department the QM application 260 may ask the administrator 290 to clarify the department.

At 915, a vertical is determined. The vertical may be determined by the QM application 260. The vertical may be the industry associated with the team such as finance or pharmaceuticals, for example. The particular vertical associated with the team may be inferred by the QM application from the contact center data 159 or the name of the team, for example. If the QM application 260 cannot infer the vertical the QM application 260 may ask the administrator 290 to clarify the vertical.

At 920, a template is generated. The template may be generated by the QM application 260. Depending on the embodiment, the template may be generated by the QM application 260 selecting the template from a plurality of templates based on the determined vertical, communication channel, and department. In addition, the QM application 260 may use the contact center data 159 to populate data items and/or variables used by the template. After generating the template for the team, the QM application 260 may present the generated template for approval to the administrator 290, for example.

Figure 10:
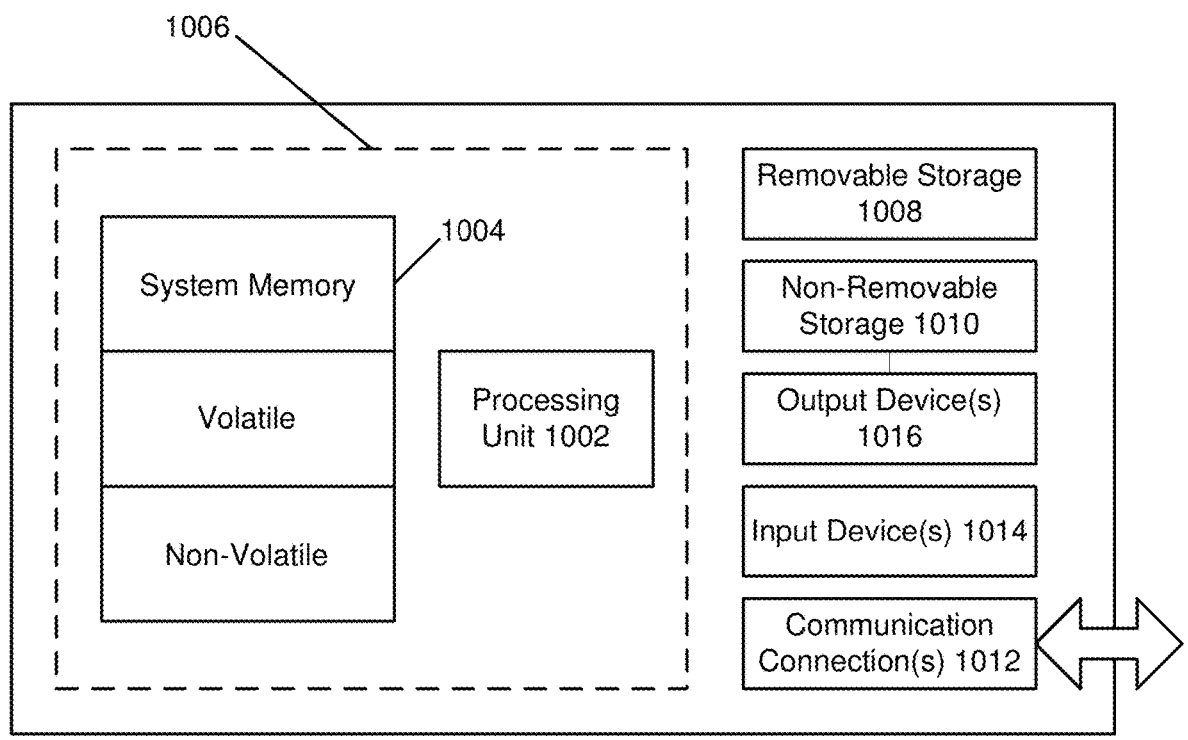
FIG. 10 illustrates an example computing device.

FIG. 10 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well-known computing systems, environments, and/or configurations that may be suitable for use include, but are not limited to, personal computers, servers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

FIG. 10 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well-known computing systems, environments, and/or configurations that may be suitable for use include, but are not limited to, personal computers, servers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 10, an exemplary system for implementing aspects described herein includes a computing device, such as computing device 1000. In its most basic configuration, computing device 1000 typically includes at least one processing unit 1002 and memory 1004. Depending on the exact configuration and type of computing device, memory 1004 may be volatile (such as random access memory (RAM)), non-volatile (such as read-only memory (ROM), flash memory, etc.), or some combination of the two. This most basic configuration is illustrated in FIG. 10 by dashed line 1006.

Computing device 1000 may have additional features/functionality. For example, computing device 1000 may include additional storage (removable and/or non-removable) including, but not limited to, magnetic or optical disks or tape. Such additional storage is illustrated in FIG. 9 by removable storage 1008 and non-removable storage 1010.

Computing device 1000 typically includes a variety of tangible computer readable media. Computer readable media can be any available tangible media that can be accessed by device 900 and includes both volatile and non-volatile media, removable and non-removable media.

Tangible computer storage media include volatile and non-volatile, and removable and non-removable media implemented in any method or technology for storage of information such as computer readable instructions, data structures, program modules or other data. Memory 1004, removable storage 1008, and non-removable storage 1010 are all examples of computer storage media. Tangible computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1000. Any such computer storage media may be part of computing device 1000.

Computing device 1000 may contain communications connection(s) 1012 that allow the device to communicate with other devices. Computing device 1000 may also have input device(s) 1014 such as a keyboard, mouse, pen, voice input device, touch input device, etc. Output device(s) 1016 such as a display, speakers, printer, etc. may also be included. All these devices are well known in the art and need not be discussed at length here.

Returning to FIG. 1, agent(s) 120 and customers 110 may communicate with each other and with other services over the network 130. For example, a customer calling on telephone handset may connect through the PSTN and terminate on a private branch exchange (PBX). A video call originating from a tablet may connect through the network 130 terminate on the media server. A smartphone may connect via the WAN and terminate on an interactive voice response (IVR)/intelligent virtual agent (IVA) components. IVR are self-service voice tools that automate the handling of incoming and outgoing calls. Advanced IVRs use speech recognition technology to enable customers to interact with them by speaking instead of pushing buttons on their phones. IVR applications may be used to collect data, schedule callbacks and transfer calls to live agents. IVA systems are more advanced and utilize artificial intelligence (AI), machine learning (ML), advanced speech technologies (e.g., natural language understanding (NLU)/natural language processing (NLP)/natural language generation (NLG)) to simulate live and unstructured cognitive conversations for voice, text and digital interactions. In yet another example, Social media, email, SMS/MMS, IM may communicate with their counterpart's application (not shown) within the contact center 150.

The contact center 150 itself be in a single location or may be cloud-based and distributed over a plurality of locations. The contact center 150 may include servers, databases, and other components. In particular, the contact center 150 may include, but is not limited to, a routing server, a SIP server, an outbound server, a reporting/dashboard server, automated call distribution (ACD), a computer telephony integration server (CTI), an email server, an IM server, a social server, a SMS server, and one or more databases for routing, historical information and campaigns.

The ACD is used by inbound, outbound and blended contact centers to manage the flow of interactions by routing and queuing them to the most appropriate agent. Within the CTI, software connects the ACD to a servicing application (e.g., customer service, CRM, sales, collections, etc.), and looks up or records information about the caller. CTI may display a customer's account information on the agent desktop when an interaction is delivered. Campaign management may be performed by an application to design, schedule, execute and manage outbound campaigns. Campaign management systems are also used to analyze campaign effectiveness.

For inbound SIP messages, the routing server may use statistical data from reporting/dashboard information and a routing database to the route SIP request message. A response may be sent to the media server directing it to route the interaction to a target agent 120. The routing database may include: customer relationship management (CRM) data; data pertaining to one or more social networks (including, but not limited to network graphs capturing social relationships within relevant social networks, or media updates made by members of relevant social networks); agent skills data; data extracted from third party data sources including cloud-based data sources such as CRM; or any other data that may be useful in making routing decisions.

The integration of real-time and nonreal-time communication services may be performed by unified communications (UC)/presence sever. Real-time communication services include Internet Protocol (IP) telephony, call control, instant messaging (IM)/chat, presence information, real-time video and data sharing. Non-real-time applications include voicemail, email, SMS and fax services. The communications services are delivered over a variety of communications devices, including IP phones, personal computers (PCs), smartphones and tablets. Presence provides real-time status information about the availability of each person in the network, as well as their preferred method of communication (e.g., phone, email, chat and video).

Recording applications may be used to capture and play back audio and screen interactions between customers and agents. Recording systems may capture everything that happens during interactions and what agents do on their desktops or only selected interaction types based on configuration. Surveying tools may provide the ability to create and deploy post-interaction customer feedback surveys in voice and digital channels. Typically, the IVR/IVA development environment is leveraged for survey development and deployment rules. Reporting/dashboards are tools used to track and manage the performance of agents, teams, departments, systems and processes within the contact center. Reports are presented in narrative, graphical or tabular formats. Reports can be created on a historical or real-time basis, depending on the data collected by the contact center applications. Dashboards typically include widgets, gadgets, gauges, meters, switches, charts and graphs that allow role-based monitoring of agent, queue and contact center performance. Unified messaging (UM) applications include various messaging and communications media (voicemail, email, SMS, fax, video, etc.) stored in a common repository and accessed by users via multiple devices through a single unified interface.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for configuring a contact center communication routing system, the method comprising:
   interfacing, by a quality management application, with a contact center communication routing system;
   receiving contact center data from the contact center by the quality management application;
   receiving a selection of an item of the communication routing system to configure by the quality management application;
   based on the selected item, selecting a workflow corresponding to the selected item by the quality management application, the workflow including a sequence of tasks for processing communications by the contact center; and
   configuring the item automatically for quality control parameters using the selected workflow and the contact center data by the quality management application.

2. The method of claim 1, wherein:
   the quality control parameters include one or more evaluation frequencies for the item.

3. The method of claim 1, wherein:
   the quality control parameters include one or more coaching frequencies for the item.

4. The method of claim 1, wherein:
   the quality control parameters include one or more calibration frequencies for the item.

5. The method of claim 1, wherein:
   the quality control parameters include one or more forms.

6. The method of claim 1, wherein interfacing, by the quality management application with the contact center communication routing system comprises:
   requesting credentials from a user associated with the contact center communication routing system; and
   interfacing with the contact center communication routing system using the requested credentials.

7. A system for configuring a contact center communication routing system, the system comprising:
   at least one processor; and
   a non-transitory computer readable medium comprising instructions that, when executed by the at least one processor, cause the system to:
   interface with a contact center;
      receive contact center data from the contact center by a quality management application;
      receive a selection of an item of the communication routing system to configure by the quality management application;
   based on the selected item, select a workflow corresponding to the selected item by the quality management application, the workflow including a sequence of tasks for processing communications by the contact center; and
      configure the item automatically for quality control parameters using the selected workflow and the contact center data by the quality management application.

8. The system of claim 7, wherein:
   the quality control parameters include one or more evaluation frequencies.

9. The system of claim 7, wherein:
   the quality control parameters include one or more coaching frequencies.

10. The system of claim 7, wherein:
    the quality control parameters include one or more calibration frequencies.

11. The system of claim 7, wherein:
    wherein the quality control parameters include one or more forms.

12. The system of claim 7, wherein interfacing by the quality management application with the contact center communication routing system comprises:
    requesting credentials from a user associated with the contact center communication routing system; and
    interfacing with the contact center communication routing system using the requested credentials.

13. A non-transitory computer-readable medium comprising instructions that, when executed by at least one processor, cause a computer system to:
    interface with a contact center communication routing system;
       receive contact center data from the contact center by a quality management application;
       receive a selection of an item of the communication routing system to configure by the quality management application;

based on the selected item, select a workflow corresponding to the selected item by the quality management application, the workflow including a sequence of tasks for processing communications by the contact center; and configure the item automatically for quality control parameters using the selected workflow and the contact center data by the quality management application.

14. The computer-readable medium of claim 13, wherein: the quality control parameters include one or more evaluation frequencies.

15. The computer-readable medium of claim 13, wherein: the quality control parameters include one or more coaching frequencies.

16. The computer-readable medium of claim 13, wherein: wherein the quality control parameters include one or more calibration frequencies.

17. The computer-readable medium of claim 13, wherein: the quality control parameters include one or more forms.

* * * * *